May 20, 1952 — A. SETTER — 2,597,389
ANTIFRICTION STRUCTURE FOR WORM WHEELS AND THE LIKE
Filed Feb. 7, 1951
FIG. 1
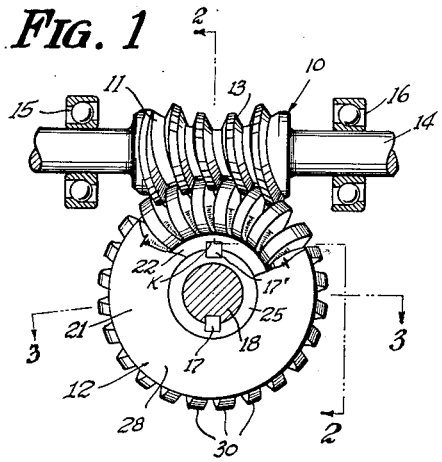
FIG. 2
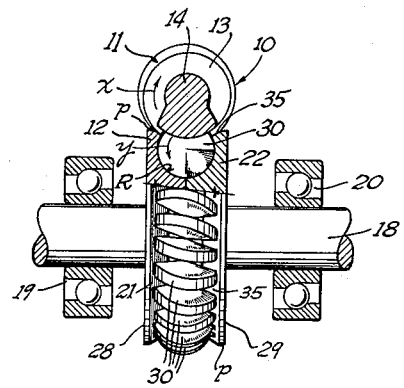
FIG. 4
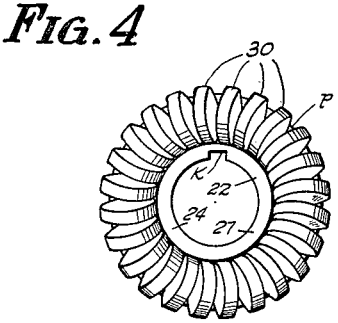
FIG. 5
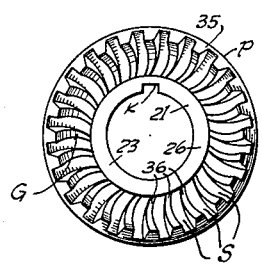
FIG. 6
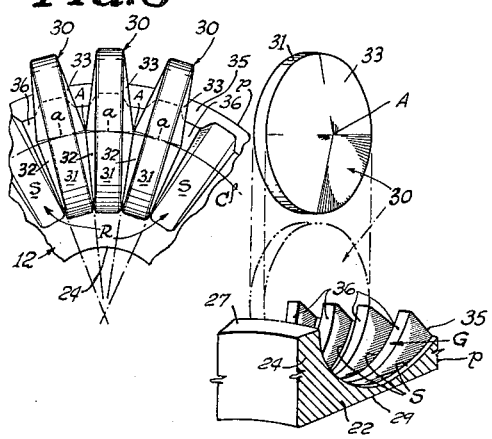
FIG. 3
FIG. 7
INVENTOR.
Arnt Setter.
BY
Leslie M. Hansen
HIS ATTORNEY.

UNITED STATES PATENT OFFICE 2,597,389

ANTIFRICTION STRUCTURE FOR WORM WHEELS AND THE LIKE

Arnt Setter, Santa Clara, Calif.

Application February 7, 1951, Serial No. 209,818

11 Claims. (Cl. 74—464)

This invention relates to power transmission and more particularly to gear construction. More specifically the present invention is directed to an anti-friction tooth structure especially useful in worm wheels and the like.

In heavy automobiles, trucks and the like, it was customary to employ worm gearing in the rear axle drive of such vehicles. However, the tooth action in worm gears involves considerably more sliding action between teeth than occurs in other forms of gearing. This excessive friction led to serious loss of power and to heavy wear in the zone of contact on the tooth surfaces. As a result, worm gearing, in many instances, has been regarded with disfavor.

Despite the fact that worm gearing is low in mechanical efficiency it is extensively used industrially due to the wide range of ratios that it conveniently affords; its capacity for high torque in small space; its compactness, and its low initial cost. In most cases the load capacity of a worm gear unit is limited only by temperature rise, rather than endurance of its teeth. As a result of this limitation it is not uncommon to find artificial cooling provided in worm gear units in the form of a fan on the worm shaft or draught fins cast on the gear casing.

The present invention contemplates the provision of a novel anti-friction tooth structure for worm wheels and the like for minimizing sliding action in the zone of contact of the teeth to thereby reduce heat generation during transmission of power.

Another object is to provide a tooth mounted for movement in and relative to a worm wheel or rack for presenting a different area of such tooth into the zone of contact after each preceding contact of such tooth with the drive gear or worm.

It is another object of this invention to provide a rotary type tooth which rolls in a plane substantially transverse to the direction of movement of such tooth during power transmission.

Another object is to provide a worm wheel in which a plurality of discs are nested for rotation in planes radially of said worm wheel and transversely of the plane in which the latter rotates.

Another object is to provide a worm wheel having mating side walls grooved to nest and retain a plurality of discs therebetween for rotation in planes radially of the worm wheel, the periphery of each disc extending beyond the peripheries of the mating side walls in the form of annularly arrayed teeth.

These and other objects and advantages of the present invention will be made apparent in the following description in the light of the drawings in which:

Fig. 1 is a side elevation of a worm gear unit embodying the present invention, parts being broken away for purposes of illustration.

Fig. 2 is a view of Fig. 1 taken along line 2—2 thereof, certain parts being shown in section while others are seen in elevation.

Fig. 3 is a section of Fig. 1 taken along line 3—3 thereof.

Fig. 4 is an enlarged vertical section through the worm wheel only of Fig. 3 taken along line 4—4 thereof and showing all of the teeth associated with the wheel in place.

Fig. 5 is a vertical section of the other side wall of the worm wheel shown in Fig. 3 as seen from line 5—5 thereof exclusive of the teeth.

Fig. 6 is a diagram showing several teeth each in radial array to illustrate the relationship of such teeth one to the other.

Fig. 7 is a perspective view of a fragment of one side wall of a worm wheel showing one tooth about to be seated in a raceway provided on the inner face of the side wall of the worm wheel shown.

The drawings show the anti-friction tooth structure of the present invention embodied in a worm wheel for operation in worm gearing with which the present invention is best suited. The worm gearing, generally designated 10 in the drawings, comprises a worm 11 and a worm wheel 12 meshing with each other for transmitting power from the worm to the worm wheel.

The worm 11 is in the form of one or more spiral threads 13 on a drive shaft 14 supported for axial rotation in suitable bearings 15 and 16 (see Fig. 1). The worm wheel 12 is keyed as at 17 to a shaft 18 (Fig. 1) extending perpendicular to the drive shaft 14 but spaced laterally therefrom and journalled for rotation in suitable bearings 19 and 20 (see Fig. 2). It will be understood that the bearings 15—16 and 19—20 are fixed relative to each other in the conventional manner by their disposition in a housing or casing, not shown.

In the present disclosure the worm 11 is shown to be of "hourglass" form (Fig. 1) so as to partially envelop the periphery of the worm wheel 12. However, it is apparent that the present invention is equally adaptable for use with a straight worm of helical threading confined to cylindrical form.

The worm wheel 12 is preferably of split construction for purposes of manufacture and assembly. Consequently, the wheel 12 comprises mating side walls 21 and 22 each having a hub 23 and 24, respectively, press-fit onto, and keyed as at 17', to a sleeve 25 by which the two side walls are united. The two side walls 21 and 22 initially consist of complementary annular halves of similar configuration having inner faces 26—27, respectively, (Fig. 3) adapted to abut each other and outer faces 28 and 29, respectively, spaced from each other a sufficient distance to confine the tooth structure between them. Thus it will be seen that the worm wheel 12 comprises complementary side walls united for movement in a plane coincident to a line bisecting these two annular halves of the worm wheel.

The teeth for the worm wheel 12, as best illustrated in Figs. 6 and 7, each consist of a disc 30 and the number of these discs required in each instance is determined by the gear ratio desired. These discs 30 are of a diameter slightly less than the distance between the outer faces 28—29 of the annular side walls 21 and 22 of the wheel 12. Under the present invention it is intended that each of these discs 30 will turn about an axis defined by the periphery 31 of each disc. Hence it will be seen that the plane in which each disc is to turn is disposed substantially transverse with respect to the direction of movement of each disc under the influence of the threading 13 on the worm 11.

A simplified detail of the basic principle and arrangement of the discs 30 relative to the worm wheel 12 is best illustrated in Fig. 6. In this view it will be seen that each disc 30 has side walls 32 and 33 of conical shape each coming to an apex A disposed concentric to the axis —a— of the respective disc 30. The pitch of these conical faces 32—33 is preferably determined by the circumference of the worm wheel 12 in which the discs are to be arranged and the number of teeth desired at the perimeter of such wheel. In this manner discs 30 of predetermined identical shape arranged one next to the other with their axes —a— disposed tangent to a common pitch circle C, are disposed with the diametrical plane of each disc 30 substantially radially relative to the aforesaid pitch circle C.

The simplified radial array of the discs 30, as shown in Fig. 6, is satisfactory for use with a worm having very little lead angle on its threading 13. However, under conditions requiring a greater lead angle on the worm thread, each disc 30 is disposed with its diametrical plane angularly disposed relative to the axis of the worm wheel in conformity with the lead angle of the threading on the worm 11 in the manner as shown in Figs. 1 through 5 in the drawings.

Referring now to Fig. 3, the inner faces 26—27 of the mating side walls 21 and 22 forming the worm wheel 12 are each cut to provide an annular groove on them. These grooves when combined form about ¾ of a circle G cross sectionally, i. e., radially, of the worm wheel. The mouth or open end E of the ¾ circle G is disposed a greater radial distance from the axis of the wheel 12 than is the pitch circle C which tangentially touches the axes —a— of each disc 30. In this manner the apexes A of each disc 30 will be partially enveloped within the ¾ circle G for reasons later to be made apparent.

In addition to the foregoing, the inner faces 26—27 of side walls 21—22 are further cut but in steps S determined by the number of teeth required. In this connection each stepped cut S is made with a tool conforming in shape to a disc 30 including the conical side faces 32—33 thereof but with sufficient clearance or tolerance to allow the discs to turn although the side walls 21 and 22 are pressed together. By setting the aforesaid cutting tool to rotate about an axis disposed out of the plane of the pitch circle C, the stepped cuts S are such as to seat each disc 30 at the proper angle to conform to the lead angle of a particular worm thread.

The appearance of the inner face of one side wall of the worm wheel 12 will be substantially as seen in Fig. 5 which shows side wall 22. When the proper number of discs 30 are placed in the stepped cuts or seats S the arrangement will be as seen in Fig. 4 showing the side wall 21 supporting the discs 30. The opposite side wall (22, Fig. 5) is then placed over the seated discs (Fig. 4) with the key slot K of each side wall aligned with that of the other. Thereafter the hubs 23—24 of the two halves 21—22 of the worm wheel are sweat onto and keyed to the sleeve 25 in a manner well known in the art. In this manner the matching pairs of stepped cuts S form a raceway R, Figs. 2 and 3, for an individual disc 30. Moreover, since the apexes A of each disc 30 are enveloped by the ¾ circle G formed by the grooved inner faces of the sides of the worm wheel, the discs 30 will be locked in place although free to turn within their respective raceways.

The extreme periphery —p— of each half of the worm wheel is a lesser distance from the axis of the worm wheel than is the orbit defined by the outwardly extending discs 30. These extreme peripheries of the side walls 21 and 22 are preferably cut inwardly as at 35, see Figs. 2 and 5, to accommodate the base diameter of the threading 13 on the worm 11 associated with the worm wheel 12.

It will be noted that the pitch circle P, upon which the axis —a— of each disc 30 tangentially touches, is well within the orbit defined by the mouths E of the ¾ circle G formed by the abutting inner faces of the two side walls 21—22. The several partitions 36 between each seat or stepped cut S separate the peripheries of the discs 30 from each other but since these partitions are formed in the ¾ circle G comprised of the grooves in the side walls, the apexes of discs 30 can contact each other. This assures that the several discs 30 seated in the raceways R will be retained between the side walls 21 and 22 and be well anchored therebetween for transmitting motion to the worm wheel in the direction of rotation thereof. Moreover, since the seats S are cut in conformity with the configuration of each disc 30 and sufficient clearances are provided the discs 30 will freely turn relative to the worm wheel 12 in a plane substantially transversely of the direction of rotation of the worm wheel.

From the foregoing it will be apparent that only a segmental portion of each disc 30 extends beyond the periphery —p— of the side walls 21—22 in a position for contact with the threading 13 of the worm 11. Moreover, when the threading 13 is advanced spirally upon rotation of the drive shaft 14 (in the direction of arrow x Fig. 2) the forward face of thread 13 engages the rearmost conical face 33 of a disc 30 adjacent the thread 13. The actual zone of contact between the threading and the discs in each case is confined to that portion of the disc which extends beyond the periphery —p— of the worm wheel halves 21—22. In other words, the extended portions of the discs 30 become the teeth of the worm wheel 12 which are engaged within a zone of contact in a sweeping or sliding action by the forward face of the thread 13.

Since each tooth or disc 30 is freely rotatable within its raceway R, the sweeping or sliding action in the zone of contact between the thread 13 and the rearmost conical face 33 effects a turning of the disc thus engaged (see arrow Y Fig. 2). However, the advancing effect of the spiral thread 13 is transmitted to each tooth or disc for turning the worm wheel 12 about its axis in the usual fashion. In this manner frictional contact between the threading 13 and each tooth or disc 30 is reduced and as a result generation of heat is minimized.

In addition to the foregoing, since each sweeping or sliding action of the thread 13 against the tooth disc 30 effects turning of the teeth, a different part of the conical surface 33 is presented into the zone of contact. Consequently, even though some heat is generated in each disc or tooth upon each contact with the worm thread, the area of the tooth contacted is constantly altered allowing for cooling. Furthermore, since a different area of the conical surface 33 is presented to the zone of contact upon each revolution of the worm wheel, wearing of the teeth or discs is appreciably reduced and minimized.

It should also be noted that lubrication of the conical surface 33 of each tooth disc 30 is assured by reasons of its periodic contact with the forward conical surface 32 on an adjacent disc during turning of each disc relative to the worm wheel 12. Consequently, the presentation of a different area of the conical surface 33 into the zone of contact assures that a film of lubricant will be present on each tooth before contact thereof with the worm thread.

While the foregoing disclosure is made in specific detail it will be apparent to those skilled in the art that the structure defined can be varied, altered and/or modified without departing from the spirit of my invention. I therefore desire to avail myself of all variations, alterations and modifications as fairly come within the purview of the appended claims.

What I claim as new and desire to protect by Letters Patent is:

1. An anti-friction tooth structure for a driven member such as a worm wheel and the like comprising complementary side walls united for movement in a plane coincident to a bisecting line between the inner faces of said complementary side walls, said side walls having diametrically opposite matching grooves in their inner faces cooperating to provide a partially annular raceway opening onto one surface of said complementary side walls, and a disc mounted for turning movement in said partially annular raceway whereby a segmental portion of said disc extends beyond said one surface of said complementary side walls to provide a tooth thereon.

2. An anti-friction tooth structure for a driven member such as a worm wheel and the like comprising complementary side walls secured together with their inner faces abutting each other, said side walls having matching half circle grooves formed in their inner faces from a center coincident with their inner faces and less than a radial distance from one surface of said complementary side walls for providing a partially annular raceway the diameter of which extends substantially transverse between said side walls, and a disc mounted for turning movement within said partially annular raceway whereby a segmental portion of said disc extends beyond said one surface of said complementary side walls in the form of a tooth.

3. An anti-friction tooth structure for a driven member such as a worm wheel and the like comprising complementary side walls secured together for movement in a plane coincident to a bisecting line between them, said side walls having their inner faces adjacent said bisecting line provided with half circle grooves each centered on said bisecting line and cooperating to form a partially annular raceway opening onto one surface of said complementary side walls, a worm arranged adjacent said one surface of said side walls for rotation about an axis coincident to said bisecting line between said side walls, said worm having spiral threading extending beyond said one surface of said side walls toward the opening of said partially annular raceway formed on the inner faces of said side walls, and a disc arranged in said raceway for turning movement relative to said side walls and having a segmental portion thereof extending into a zone of contact with the threading on said worm.

4. An anti-friction tooth structure for a driven member such as a worm wheel and the like comprising complementary side walls secured together for movement in a plane coincident to a bisecting line between them, said side walls having their inner faces adjacent said bisecting line provided with half circle grooves each centered on said bisecting line and cooperating to form a partially annular raceway opening onto one surface of said complementary side walls, a worm arranged adjacent said one surface of said side walls for rotation about an axis coincident to said bisecting line between said side walls, said worm having spiral threading extending beyond said one surface of said side walls toward the opening of said partially annular raceway formed on the inner faces of said side walls, and a disc arranged in said raceway and having a segmental portion thereof extending into a zone of contact with the threading on said worm for turning movement within said raceway under the influence of frictional contact of said disc with said spiral threading whereby a different segmental portion of said disc is presented to said zone of contact upon each successive engagement of said disc with the threading on said worm.

5. An anti-friction tooth structure for driven members such as worm wheels and the like comprising complementary side walls secured together for movement in a predetermined direction, said side walls having matching diametrically opposed half circle grooves formed in their inner faces providing a partially annular raceway opening onto one surface of said complementary side walls, a worm arranged for rotation adjacent said one surface of said complementary side walls whereby the threading of said worm extends into the open end of said raceway, and a disc mounted for turning movement within said raceway and having a segmental portion extending into a zone of contact with the threading of said worm.

6. An anti-friction tooth structure for a driven member such as a worm wheel and the like comprising complementary side walls secured together for movement in a direction coincident to their abutting inner faces, said side walls having matching diametrically opposed half circle grooves cut into their inner abutting faces adjacent one surface of said complementary side walls for providing a partially annular raceway disposed substantially transverse to the plane of movement of said driven member, and a disc arranged in the raceway provided between said complementary side walls and extending partially beyond said one surface of the latter.

7. An anti-friction tooth structure for a driven member such as a worm wheel and the like comprising complementary side walls secured together for movement in a direction coincident to their abutting inner faces, said side walls having matching diametrically opposed half circle grooves cut into their inner abutting faces adjacent one surface of said complementary side walls for providing a partially annular raceway disposed substantially transverse to the plane of movement of said driven member, a worm arranged for rotation adjacent said one surface of said side walls with the threading of said worm extending beyond said one surface and toward the open end of said partially annular raceway, and a disc arranged in the raceway provided between said complementary side walls and extending partially beyond said one surface of the latter into a zone of contact with the threading of said worm for turning movement within said raceway under the influence of the threading of said worm to thereby present a different segment of said disc into the zone of contact with the threading of said worm.

8. A worm gear arrangement of the type having a worm and a wheel each journalled for driving relation with their teeth disposed for engagement with each other while in a zone of contact, said wheel comprising complementary annular side walls, means for uniting said annular side walls with their inner faces abutting each other, said side walls having a plurality of radially spaced grooves cut into their inner faces on a radius centered on a line bisecting said inner faces and matching substantially transverse to the periphery of said wheel for providing a plurality of annular raceways, said annular raceways having their centers disposed on a common pitch circle spaced inwardly from the periphery of said wheel so that each raceway opens up onto the periphery of said wheel, and a disc arranged in each of said raceways so that a segmental portion of each disc extends beyond the periphery of said wheel into the zone of contact with said worm.

9. A worm gear arrangement of the type having a worm and a wheel each journalled for driving relation with their teeth disposed for engagement with each other while in a zone of contact, said wheel comprising complementary annular side walls, means for uniting said annular side walls with their inner faces abutting each other, said side walls having a plurality of radially spaced grooves cut into their inner faces on a radius centered on a line bisecting said inner faces and matching substantially transverse to the periphery of said wheel for providing a plurality of annular raceways, said annular raceways having their centers disposed on a common pitch circle spaced inwardly from the periphery of said wheel so that each raceway opens up onto the periphery of said wheel, and a disc arranged in each of said raceways so that a segmental portion of each disc extends beyond the periphery of said wheel into the zone of contact with said worm whereby a different segmental portion of a disc is presented into the zone of contact upon each engagement of said disc with said worm.

10. A worm gear arrangement of the type having a worm and a wheel each journalled for driving relation with their teeth disposed for engagement with each other within a zone of contact, said wheel comprising complementary annular halves united with their inner faces in substantial abutting relation, said annular halves having a plurality of matching grooves formed into their inner faces for providing a plurality of annular raceways the axes of which tangentially touch upon an imaginary pitch circle of lesser diameter than that of the periphery of the complementary annular halves of said wheel, and a disc disposed in each of said raceways with a segmental portion of each said discs extending into said zone of contact whereby to effect turning of each disc in its raceway to thereby present a different segmental portion of said discs to said zone of contact upon each successive engagement of said discs with the teeth of said worm.

11. An antifriction tooth structure for a worm wheel journalled for rotation adjacent a worm thread, said worm wheel comprising complementary side walls united for turning movement, a plurality of discs arranged with their axes touching tangentially upon an imaginary pitch circle of lesser diameter than that of the periphery of said complementary side walls whereby said discs will lie in annular array with their conical side walls adjacent each other inwardly of said pitch circle, said complementary side walls having half circle grooves formed in their inner faces cooperating to form radially spaced raceways conforming in configuration to the contour of each of said discs and opening onto the periphery of said complementary side walls whereby a segmental portion of each said disc extends beyond the periphery of said complementary side walls for engagement with said worm thread for turning said discs within said raceway to expose a different segmental portion of said discs beyond the periphery of said complementary side walls incident to each driving impulse of the worm thread upon said discs.

ARNT SETTER.

No references cited.